United States Patent
Ould-Ahmed-Vall et al.

(10) Patent No.: US 10,248,488 B2
(45) Date of Patent: Apr. 2, 2019

(54) FAULT TOLERANCE AND DETECTION BY REPLICATION OF INPUT DATA AND EVALUATING A PACKED DATA EXECUTION RESULT

(71) Applicant: Intel Corporation, Santa Clara, CA (US)

(72) Inventors: Elmoustapha Ould-Ahmed-Vall, Chandler, AZ (US); Suleyman Sair, Chandler, AZ (US); Kshitij A. Doshi, Chandler, AZ (US); Charles R. Yount, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/983,026

(22) Filed: Dec. 29, 2015

(65) Prior Publication Data
US 2017/0185465 A1    Jun. 29, 2017

(51) Int. Cl.
*G06F 11/16* (2006.01)
*G06F 11/07* (2006.01)
(Continued)

(52) U.S. Cl.
CPC .......... *G06F 11/079* (2013.01); *G06F 9/3001* (2013.01); *G06F 9/30036* (2013.01);
(Continued)

(58) Field of Classification Search
CPC ...... G06F 9/3889; G06F 9/3836; G06F 9/383; G06F 9/30163; G06F 9/30167;
(Continued)

(56) References Cited

U.S. PATENT DOCUMENTS

| 4,924,467 A * | 5/1990 | Criswell ............. G06F 11/1608 |
| | | 700/10 |
| 2003/0061535 A1* | 3/2003 | Bickel ................. G06F 11/1658 |
| | | 714/11 |

(Continued)

FOREIGN PATENT DOCUMENTS

EP    0297890 A2    1/1989

OTHER PUBLICATIONS

Design Approach for Fault Recoverable ALU with Improved Fault Tolerance published by International Journal of VLSI design & Communication Systems, Aug. 2015 http://aircconline.com/vlsics/V6N4/6415vlsi02.pdf.*

(Continued)

*Primary Examiner* — Joseph O Schell
(74) *Attorney, Agent, or Firm* — Nicholson De Vos Webster & Elliott LLP

(57) ABSTRACT

Systems, methods, and apparatuses for fault tolerance and detection are described. For example, an apparatus including circuitry to replicate input sources of an instruction; arithmetic logic unit (ALU) circuitry to execute the instruction with replicated input sources using single instruction, multiple data (SIMD) hardware to produce a packed data result; and comparison circuitry coupled to the ALU circuitry to evaluate the packed data result and output a singular data result into a destination of the instruction is described.

13 Claims, 17 Drawing Sheets

(51) Int. Cl.
G06F 9/30 (2018.01)
G06F 9/38 (2018.01)
G06F 9/455 (2018.01)
G06F 15/80 (2006.01)

(52) U.S. Cl.
CPC ............ G06F 9/3861 (2013.01); G06F 9/455 (2013.01); G06F 11/0745 (2013.01); G06F 11/0751 (2013.01); G06F 11/0772 (2013.01); G06F 11/1629 (2013.01); G06F 11/1641 (2013.01); G06F 9/30189 (2013.01); G06F 9/30196 (2013.01); G06F 9/3889 (2013.01); G06F 11/1608 (2013.01); G06F 15/8007 (2013.01)

(58) Field of Classification Search
CPC ............ G06F 9/30189; G06F 9/30196; G06F 9/30036; G06F 11/1608; G06F 11/1629; G06F 11/1641; G06F 15/8007
See application file for complete search history.

(56) References Cited

U.S. PATENT DOCUMENTS

| | | | | |
|---|---|---|---|---|
| 2006/0190700 A1* | 8/2006 | Altman | ............... | G06F 11/1641 712/7 |
| 2008/0141012 A1* | 6/2008 | Yehia | ............... | G06F 9/30036 712/226 |
| 2008/0209185 A1* | 8/2008 | Ahmed | ............... | G06F 9/30014 712/222 |
| 2010/0106944 A1* | 4/2010 | Symes | ............... | G06F 9/3887 712/208 |
| 2012/0239909 A1* | 9/2012 | Nickolls | ............. | G06F 9/30087 712/220 |
| 2014/0172936 A1 | 6/2014 | Tomono et al. | | |
| 2014/0195778 A1* | 7/2014 | Ould-Ahmed-Vall | | G06F 9/30185 712/22 |
| 2014/0297995 A1 | 10/2014 | Chang et al. | | |
| 2015/0019838 A1* | 1/2015 | Anderson | ........... | G06F 9/30036 712/22 |

OTHER PUBLICATIONS

Parallel Architectures Course lecture 11: Vector and SIMD Processors by Vijay Nagarajan published by University of Edinburgh, 2013 http://www.inf.ed.ac.uk/teaching/courses/pa/Notes/lecture11-vector.pdf.*

"Introduction and Logic to Provide Vector Load-Op/Store-Op with Stride Functionality" by Ould-Ahmed-Vall published Apr. 4, 2013 as WO 2013/048369 A1.*

Wikipedia's Accumulator (computing) historical version published Sep. 13, 2015 https://en.wikipedia.org/w/index.php?title=Accumulator_(computing)&oldid=680878372 (Year: 2015).*

Chen Z., et al., "Software Fault Tolerance for FPUs via Vectorization," International Conference on Embedded Computer Systems: Architectures, Modeling, and Simulation (SAMOS XV), Jul. 2015, pp. 203-210. (Year: 2015).*

Chen Z., et al., "Software Fault Tolerance for FPUs via Vectorization," International Conference on Embedded Computer Systems: Architectures, Modeling, and Simulation (SAMOS XV), Jul. 2015, pp. 203-210.

International Search Report and Written Opinion for Application No. PCT/US2016/069062, dated Apr. 17, 2017, 12 pages.

* cited by examiner

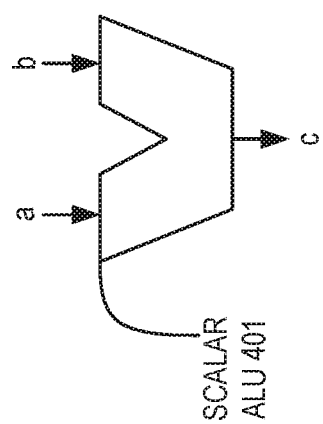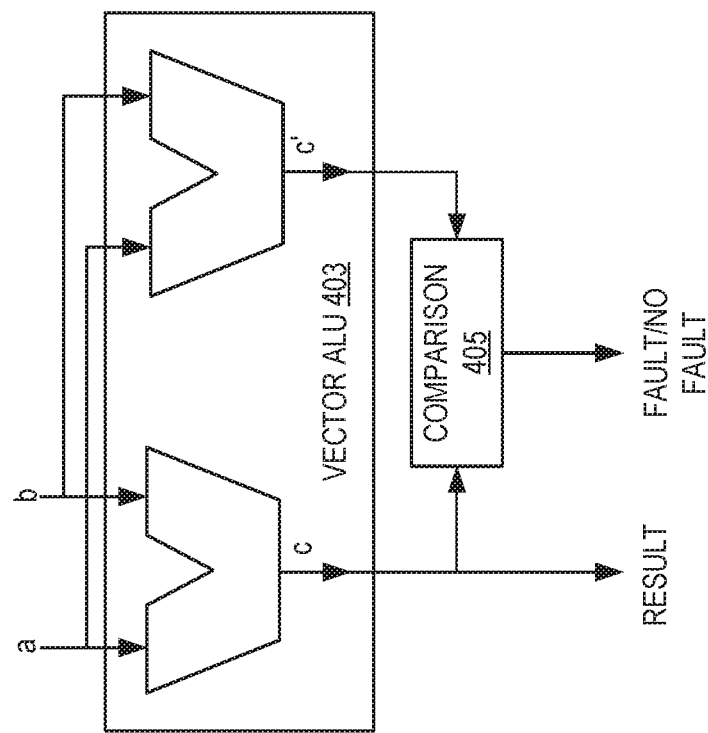
FIG. 4

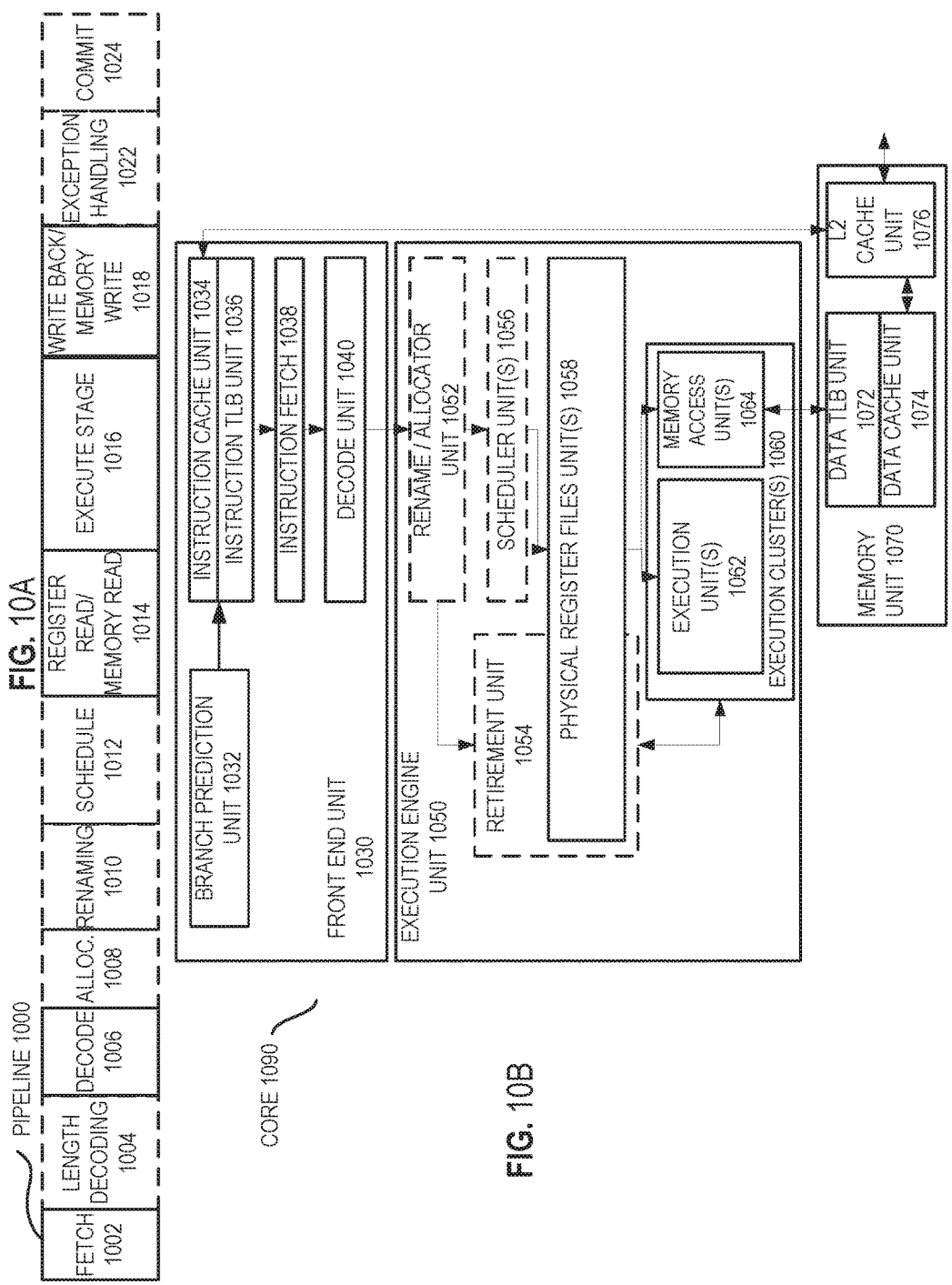

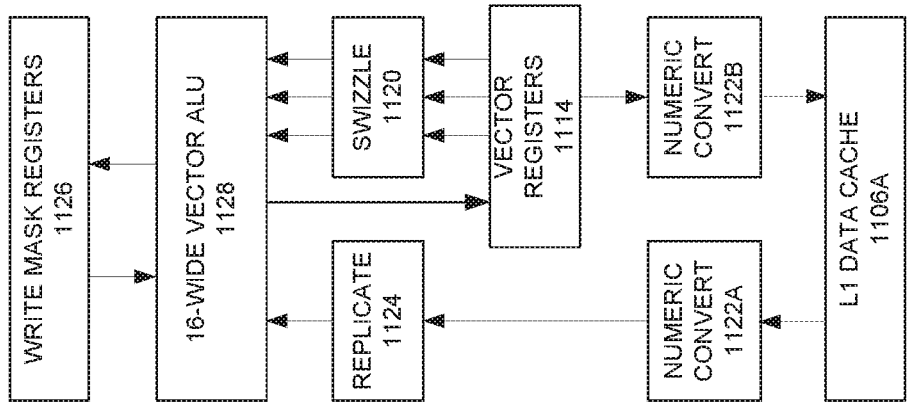
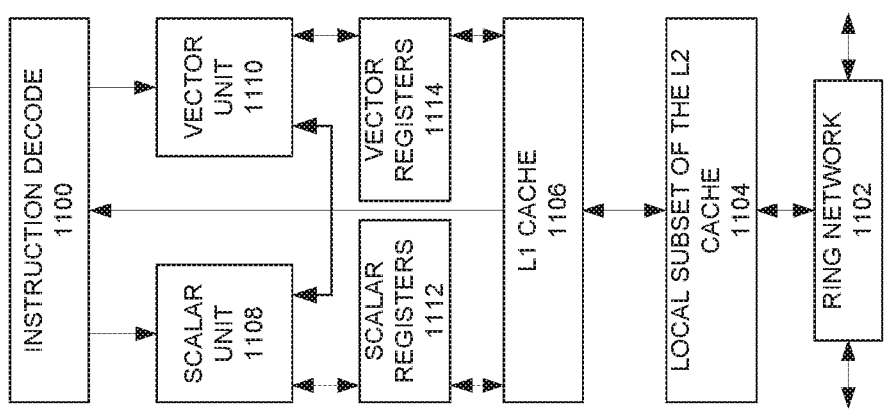

… (1)

FAULT TOLERANCE AND DETECTION BY REPLICATION OF INPUT DATA AND EVALUATING A PACKED DATA EXECUTION RESULT

FIELD OF INVENTION

The field of invention relates generally to computer processor architecture, and, more specifically, to fault tolerance and detection.

BACKGROUND

Fault tolerance and fault detection features are not typically applied to data-transformation units such as arithmetic-logic units (ALUs) in high-production processors because the implementation costs exceed the benefit. However, reducing the dimensions and increasing the number of transistors in a package increases the probability of faults due to alpha particles and other causal factors.

BRIEF DESCRIPTION OF THE DRAWINGS

The present invention is illustrated by way of example and not limitation in the figures of the accompanying drawings, in which like references indicate similar elements and in which:

FIG. 4 illustrates an embodiment of an apparatus for replicated operation for fault detection;

FIG. 10A is a block diagram illustrating both an exemplary in-order pipeline and an exemplary register renaming, out-of-order issue/execution pipeline according to embodiments of the invention;

FIG. 10B is a block diagram illustrating both an exemplary embodiment of an in-order architecture core and an exemplary register renaming, out-of-order issue/execution architecture core to be included in a processor according to embodiments of the invention;

FIGS. 11A-B illustrate a block diagram of a more specific exemplary in-order core architecture, which core would be one of several logic blocks (including other cores of the same type and/or different types) in a chip;

DETAILED DESCRIPTION

Figure 1:
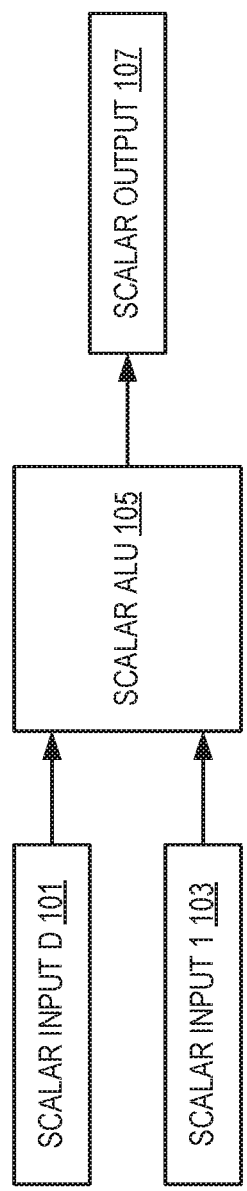
FIG. 1 illustrates an example of a typical scalar execution on two scalar input operands.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed herein are embodiments using SIMD hardware to detect and/or correct transient and/or permanent faults in ALUs with negligible increase in hardware cost and software performance. For the region of code that is to be affected, this entails replicating inputs, carrying out the ALU operations on SIMD units, and comparing the results at different points before values are committed to become part of program state. The replication of inputs and checking of results is done transparently to the user by hardware.

In short, when enabled, a sequence of ALU operations are performed redundantly across the SIMD execution units (this will be called a "redundant sequence"). This redundant sequence may contain integer and/or floating point operations, depending on what vector operations are supported by the hardware. Throughout the redundant sequence, the results are horizontally compared. For fault detection, if any result is different, a fault has been detected. For fault tolerance, a majority vote is taken to determine the final result.

In some embodiments, the redundant sequence is turned on and off by the program or the OS such as by using "redundant" instructions (the opcode indicating to use redundancy) or by writing to a control register to turn on redundancy.

When redundancy is used, for scalar operations, inputs to that operation are replicated either implicitly or explicitly. For fault detection, at least one copy is explicitly made so that at least two redundant sequences are done in parallel. For fault tolerance, at least two copies are made so that at least three redundant sequences are done in parallel. The total number of sequences is odd to guarantee a majority result. This is commonly referred to as n-modular redundancy. When n equals three, it is known as triple-modular redundancy or TMR. In most embodiments, input replication will be implemented in a way that no vector registers from the running application will be impacted. For example, checkpointing the register aliasing table and renaming the vector registers, or by routing scalar inputs to vector ALUs and replicating values across ALU input registers allows for this.

During redundancy, the same ALU operations are performed as in the original code, except that they are done using the vector or parallel ALUs that implement the same instructions. Then a comparator (for fault detection) or a majority-voter (for fault tolerance) at the output of the ALU is utilized. Typically, the result would be put into the least significant position in the result SIMD register or into a scalar register.

At the end of this ALU operation, if there are no faults, all values within each of the result vectors should be the same. To add reliability, the values are compared and one of the following is done. For fault detection, the result values are tested for equality using a comparator. If they are not equal, a fault in the CPU was detected, and some interrupt or error handler software determines whether to signal an error, retry the sequence, etc. For fault tolerance, a final result is generated by a bit-by-bit majority vote across the vector. For TMR with the three results x0, x1 and x2, this can be computed as: ((x0 AND x1) OR (x0 AND x2) OR (x1 AND x2)). Note that in the fault tolerance instance, a result is always produced and there is an option to signal any disagreement.

In some embodiments, to allow the simultaneous use of vectorization for both performance and reliability, the replicated input value need not be a scalar value; it can itself be a vector of values. The only requirement is that the total size of the original (non-redundant) vector be small enough to allow additional replication to add reliability. For example, one could replicate 128-bit vectors (e.g., four single-precision FP values) on 256-bit or larger hardware for fault detection as shown. Similarly, one could replicate 128-bit vectors on 512-bit vector hardware for fault tolerance. As such, added value in the form of additional reliability to code written specifically for an older generation of processors is made without changing the underlying vector algorithms. In some embodiments, existing vector operations for faults by using the wider vector hardware are covered. For example, when an application already using 128-bit vectors it may call for replicating the 128-bit values across a 256-bit or 512-bit register.

Note that vector (SIMD) ALUs throughout this specification have a plurality of functional/execution units to perform operations.

FIG. 1 illustrates an example of a typical scalar execution on two scalar input operands. The input operands, scalar input 0 101 and scalar input 1 103, are input into a scalar ALU 105 to produce a scalar output 107. For example, ADD R1, R2, R3 where R2 and R3 are added are to be stored in R1.

Figure 2:
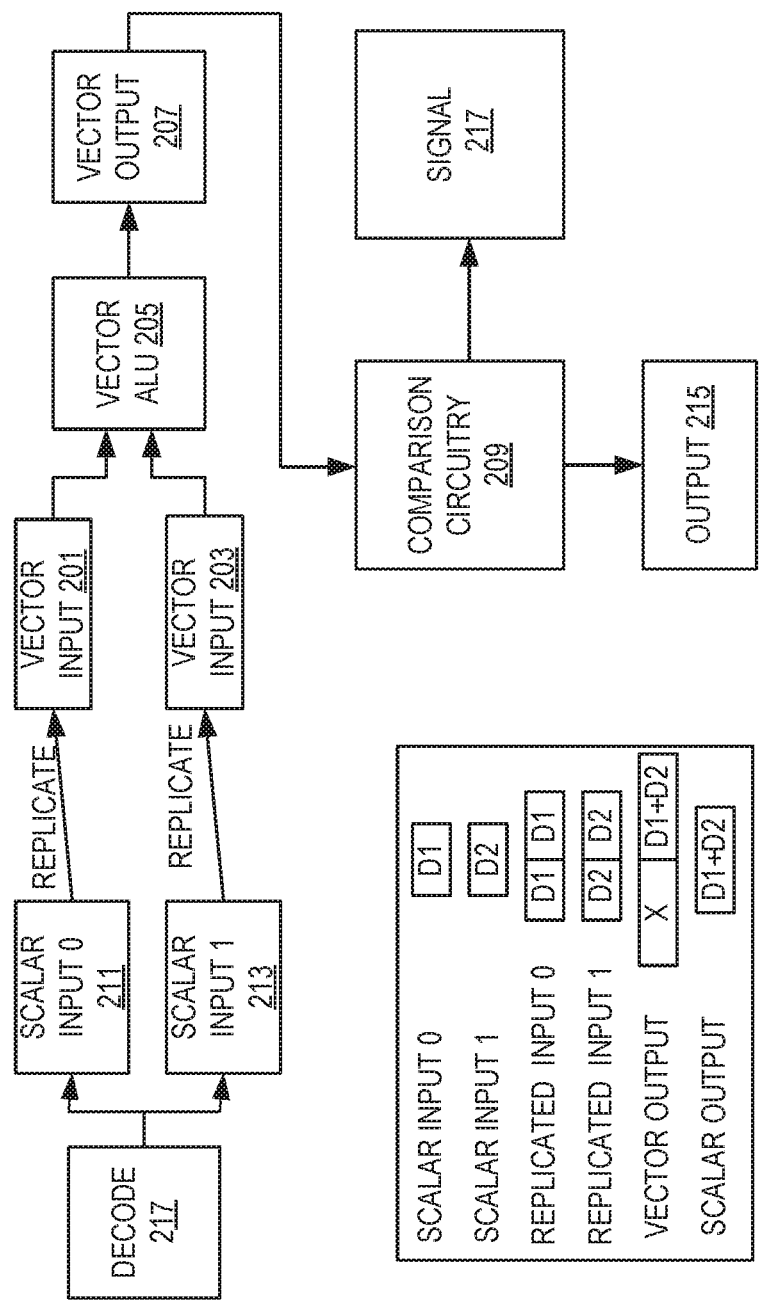
FIG. 2 illustrates a block diagram of circuitry for fault detection on an operation performed on two scalar inputs.

FIG. 2 illustrates a block diagram of circuitry for fault detection on an operation performed on two scalar inputs. A decode circuit 217 decodes an instruction having scalar inputs. The decode circuit 217 maps the decoded instruction to a vector/SIMD instruction that will use vector inputs as needed.

The input operands, scalar input 0 211 and scalar input 1 213, replicated into temporary vector inputs (such as vector registers) 201 and 203 respectively. For example, scalar input 0 is D1 and scalar input 1 is D2. These values are replicated into two vector inputs as data elements. This replication may be implicit (provided to the ALU without the use of an intermediate packed data register) or explicit (duplicated in a packed data register). As such, vector input 201 has data elements each having a value D1 and vector input 203 has data elements each having a value D2. Typically, the input values are replicated at least two times.

The vector inputs are input into a vector (SIMD) ALU 205 to produce a vector output 207. For example, ADD R1, R2, R3 where the data elements of R2 and R3 are added.

Comparison circuitry 209 compares the data elements of the vector output 207 to determine if the data elements are the same. In some embodiments, all of the data elements need to be the same or the output of the comparison circuitry 209 is a signal indicating there was a fault or if the result is tolerable. In these embodiments, when all of the data elements are the same the output is one of the data elements as an output 215. In some embodiments, the output is scalar. In other embodiments, the output value of the comparison circuitry is placed into a least significant data element position of a packed data register.

Exemplary comparison circuitry uses an AND gate to test the data elements. If any of them are not the same, then the result of the AND will be a 0 indicating a fault. In other embodiments, at least a majority of the data elements need to be the same or the output of the comparison circuitry 209 is a signal indicating there was a fault. In these embodiments, when at least a majority of the data elements are the same, the output is one of the data elements as a scalar output 215 to be stored in the scalar register of the instruction (R1 in this example). Of course, more or less stringent testing than majority may be used. In some embodiments, the output is scalar and placed in the original destination. In other embodiments, the output value of the comparison circuitry is placed into a least significant data element position of a packed data register of the mapped instruction.

Figure 3:
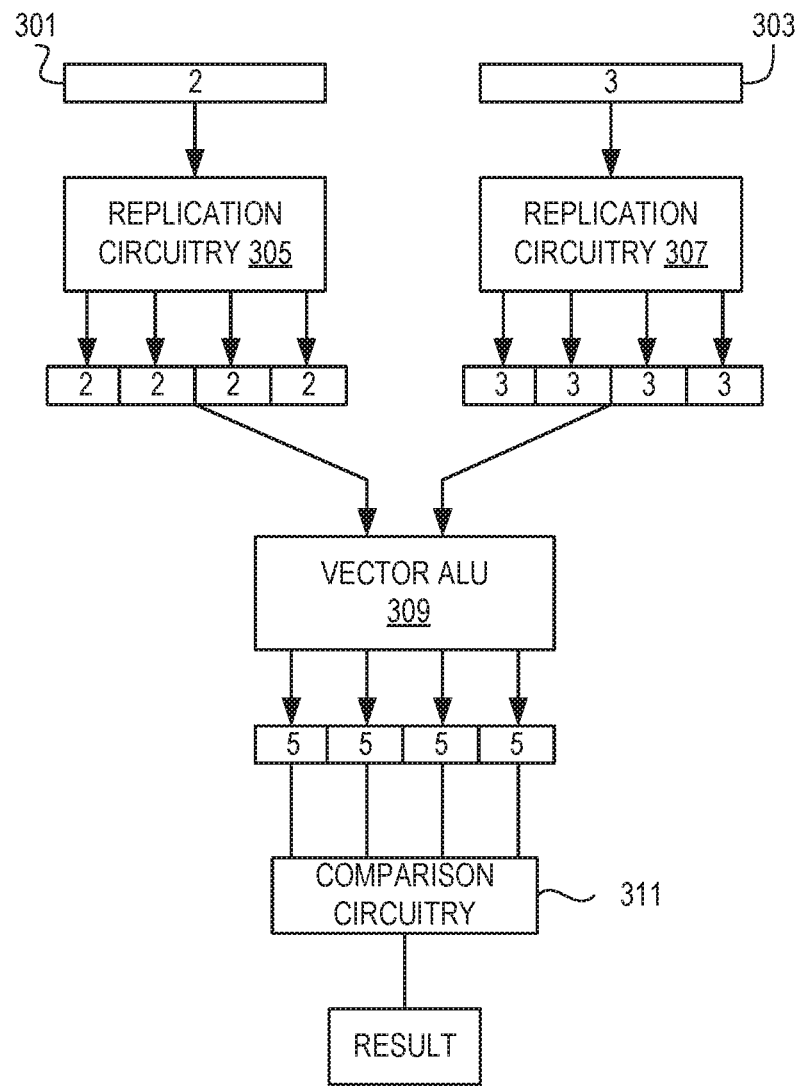
FIG. 3 illustrates a block diagram of circuitry for fault detection on an operation performed on two scalar inputs.

FIG. 3 illustrates a block diagram of circuitry for fault detection on an operation performed on two scalar inputs. In this illustration, decode circuitry such as detailed above is not shown, but is present. The input operands, 301 and 303, replicated into vector inputs (such as temporary vector registers) respectively by replication circuitry 305 and 307. For example, input 301 is 2 and input 303 is 3 and are replicated into two vector inputs as data elements.

The vector inputs are input into a vector (SIMD) ALU 309 to produce a vector output. For example, ADD R1, R2, R3 where the data elements of R2 (2) and R3 (3) are added (5).

Comparison circuitry 311 compares the data elements of the vector output of the vector ALU 309 to determine if there was a fault. Exemplary comparison circuitry uses an AND gate to test the data elements. For example, a fault may occur when all of the data elements are not the same.

In some embodiments, all of the data elements need to be the same or the output of the comparison circuitry 311 is a signal indicating there was a fault. In these embodiments, when all of the data elements are the same the output is one of the data elements as a scalar output. If any of them are not the same, then the result of the AND will be a 0 indicating a fault. In other embodiments, at least a majority of the data elements need to be the same or the output of the comparison circuitry 211 is a signal indicating there was a fault. In these embodiments, when at least a majority of the data elements are the same the output is one of the data elements as a scalar output. Of course, more or less stringent testing than majority may be used. In some embodiments, the output is scalar and placed in the original destination. In other embodiments, the output value of the comparison circuitry is placed into a least significant data element position of a packed data register of the mapped instruction.

FIG. 4 illustrates an embodiment of an apparatus for replicated operation for fault detection. On the left side of the figure, an original scalar operation is shown. Inputs a and b are provided to a scalar ALU 401 to produce an output c.

The right side of the figure illustrates an embodiment of replicated operation. Input data a and b is provided to an execution unit of a vector ALU 403, and it is replicated by providing the input data to at least one other execution unit of the vector ALU 403. In this embodiment, a temporary storage location is not used prior to feeding the ALU.

A result from each of the execution units of the vector ALU 403 are fed into comparator circuitry 405. The comparator circuitry 405 determines if there is a fault (as detailed above). A result is also output from one of the execution units to a register. In some embodiments, the output is scalar and placed in the original destination. In other embodiments, the output value of the comparison circuitry is placed into a least significant data element position of a packed data register of the mapped instruction. However, whether or not that output is architecturally committed (written back) is dependent upon whether or not there is a fault. When there is no fault, then the result is committed.

Figure 5:
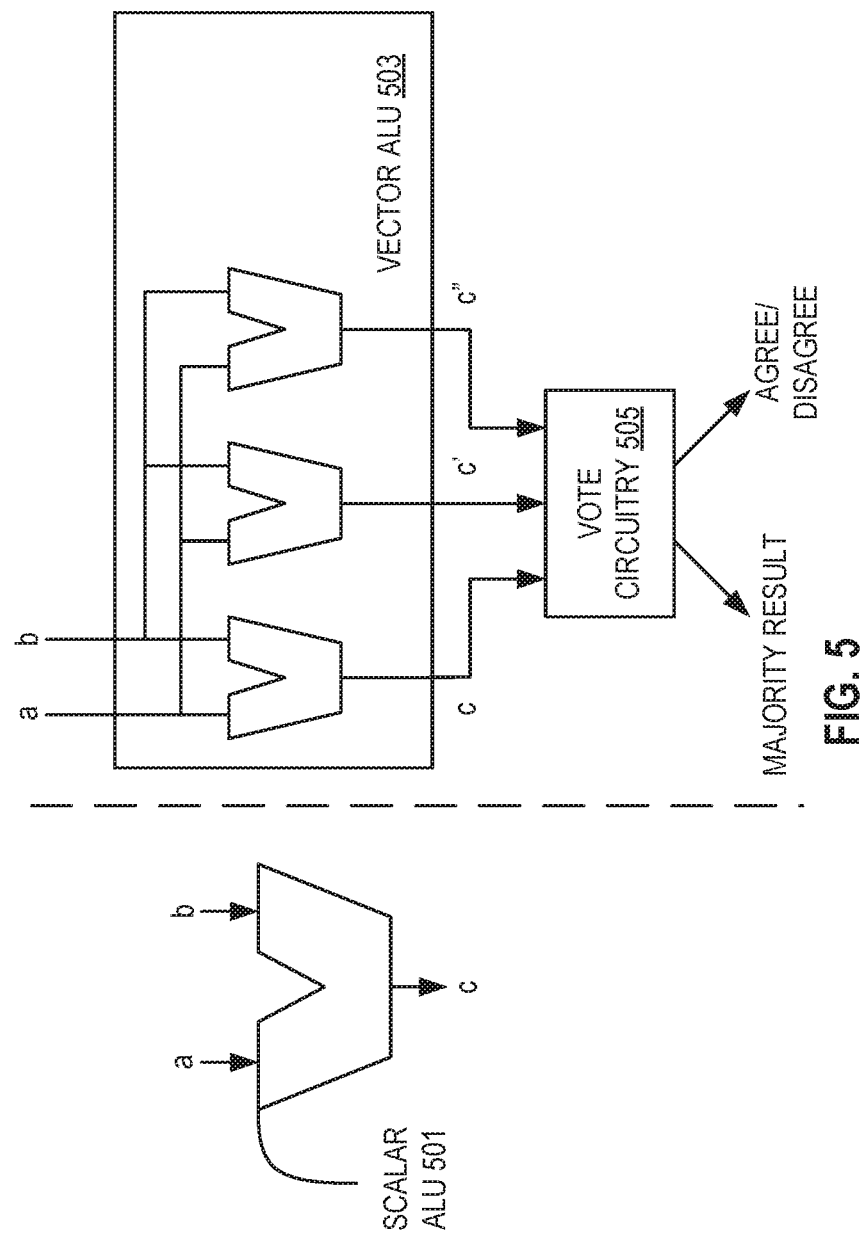
FIG. 5 illustrates an embodiment of an apparatus for replicated operation for fault tolerance.

FIG. 5 illustrates an embodiment of an apparatus for replicated operation for fault tolerance. On the left side of the figure, an original scalar operation is shown. Inputs a and b are provided to a scalar ALU 501 to produce an output c.

The right side of the figure illustrates an embodiment of replicated operation. Input data a and b is provided to an execution unit of a vector ALU 503, and it is replicated by providing the input data to at least one other execution unit of the vector ALU 503. In this embodiment, temporary storage is not used prior to feeding the ALU. However, in other embodiments, temporary storage is used to hold replicated data values.

A result from each of the execution units of the vector ALU 503 are fed into vote circuitry 505. The vote circuitry 505 determines by voting if the result is correct. In some embodiments, the vote is a majority vote and the resultant data value that has the most votes is output as the result. In other embodiments, a final result is generated by a bit-by-bit majority vote across the vector. In some embodiments, the output is scalar and placed in the original destination. In other embodiments, the output value of the comparison circuitry is placed into a least significant data element position of a packed data register of the mapped instruction. For TMR with the three results x0, x1 and x2, this can be computed as: ((x0 AND x1) OR (x0 AND x2) OR (x1 AND x2)). Additionally, in some embodiments, a signal is output to indicate any disagreements in the voting.

Figure 6:
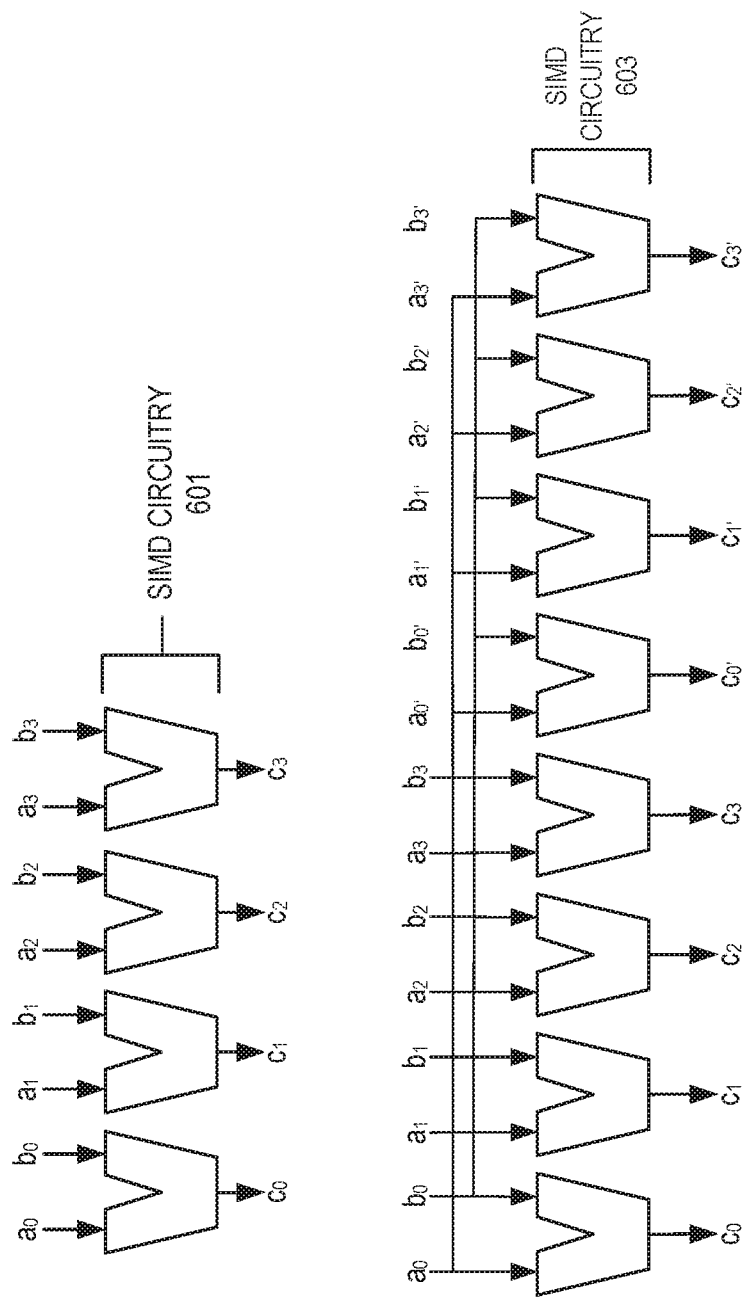
FIG. 6 illustrates an embodiment of an apparatus for replicated operation for fault detection or tolerance for a vector operation.

FIG. 6 illustrates an embodiment of an apparatus for replicated operation for fault detection or tolerance for a vector operation. At the top of the illustration, a typical SIMD operation (such as a 128-bit operation) is performed using SIMD circuitry.

Shown in the bottom is a SIMD operation using data element replication that is subjected to either fault detection or fault tolerance circuitry.

Figure 7:
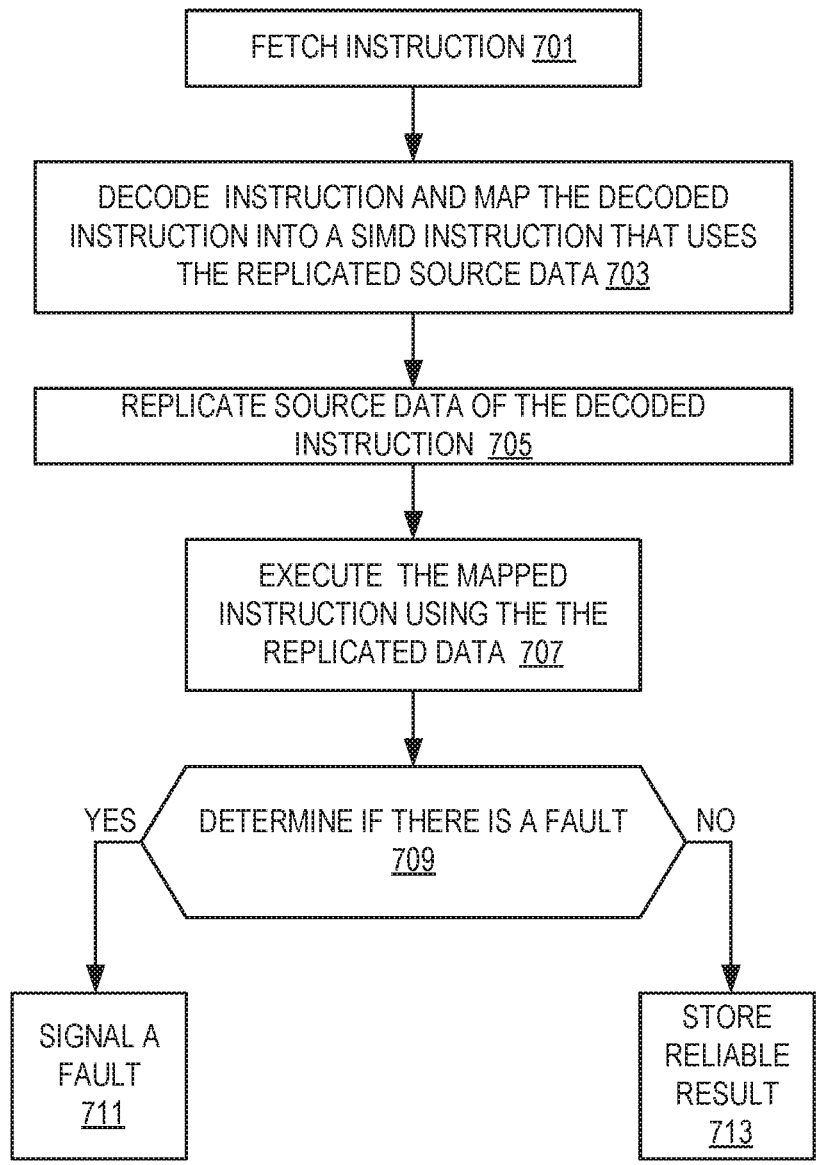
FIG. 7 illustrates an embodiment of a method for fault detection using operand replication.

FIG. 7 illustrates an embodiment of a method for fault detection using operand replication. At 701 an instruction is fetched. For example, an ADD R1, R2, R3 instruction is fetched wherein R1 and R2 are to be added and stored in R1. The fetched instruction may be scalar or vector.

The fetched instruction is decoded at 703. Additionally, the decoded instruction is mapped to a SIMD instruction that will use replicated data elements if needed.

The source operand data of the decoded instruction is fetched and replicated/duplicated at 705. In some embodiments, duplication is done by checkpointing a register aliasing table (RAT) and renaming the vector registers. In other embodiments, duplication is done by routing the inputs to vector ALUs and replicating values across ALU inputs The decoded instruction is executed using the fetched data and its duplicates at 707. As detailed above, different ALU execution units of a vector execution circuit are utilized such that the fetched data and duplicates are processed in parallel for the same operation.

A determination of if there is a fault in the operations is made at 709. For example, a comparison of the results is made and if they are not equal, then there is a fault. When there is a fault it is signaled at 711 for handling. When there is not a fault, then the result is either put into a data element of a destination operand (SIMD register) of the mapped instruction or a scalar operand (scalar register) of the non-mapped instruction at 713.

Figure 8:
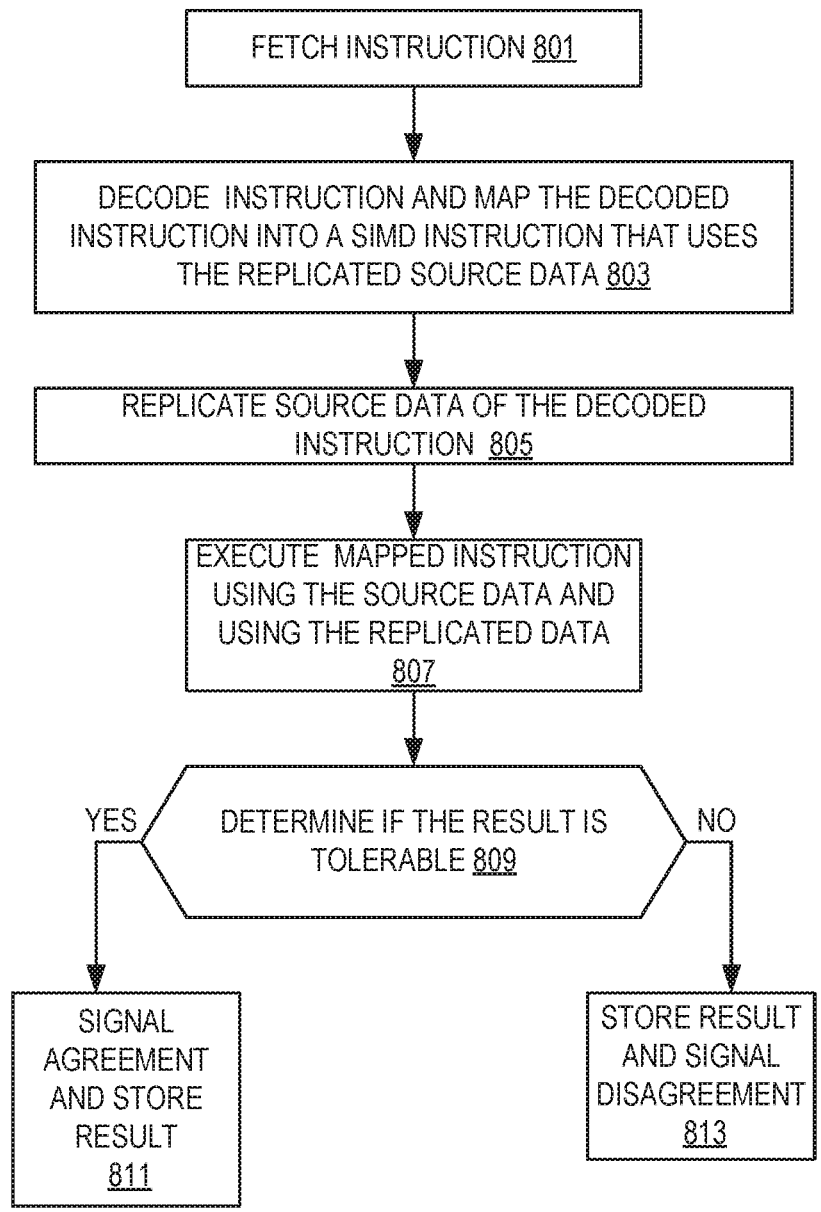
FIG. 8 illustrates an embodiment of a method for fault detection using operand replication.

FIG. 8 illustrates an embodiment of a method for fault detection using operand replication. At 801 an instruction is fetched. For example, an ADD R1, R2, R3 instruction is fetched wherein R1 and R2 are to be added and stored in R1. The fetched instruction may be scalar or vector.

The fetched instruction is decoded at 803. Additionally, the decoded instruction is mapped to a SIMD instruction that will use replicated data elements if needed.

The source operand data of the decoded instruction is fetched and duplicated at 805. In some embodiments, duplication is done by checkpointing a register aliasing table (RAT) and renaming the vector registers. In other embodiments, duplication is done by routing the inputs to vector ALUs and replicating values across ALU inputs.

The decoded instruction is executed using the fetched data and its duplicates at 807. As detailed above, different ALU execution units of a vector execution circuit are utilized such that the fetched data and duplicates are processed in parallel for the same operation.

A determination of if the result in the operations is tolerable is made at 809. For example, a bit-by-bit majority vote is made across the results. The final result is output (stored) and a signal for any disagreements is made at 811. When there is not a disagreement, then the result is output at 813. Depending upon the embodiment, the result is put into a data element of a destination operand (SIMD register) of the mapped instruction or a scalar operand (scalar register) of the non-mapped instruction.

The figures below detail exemplary architectures and systems to implement embodiments of the above. In some embodiments, one or more hardware components and/or instructions described above are emulated as detailed below, or implemented as software modules.

Exemplary Register Architecture

Figure 9:
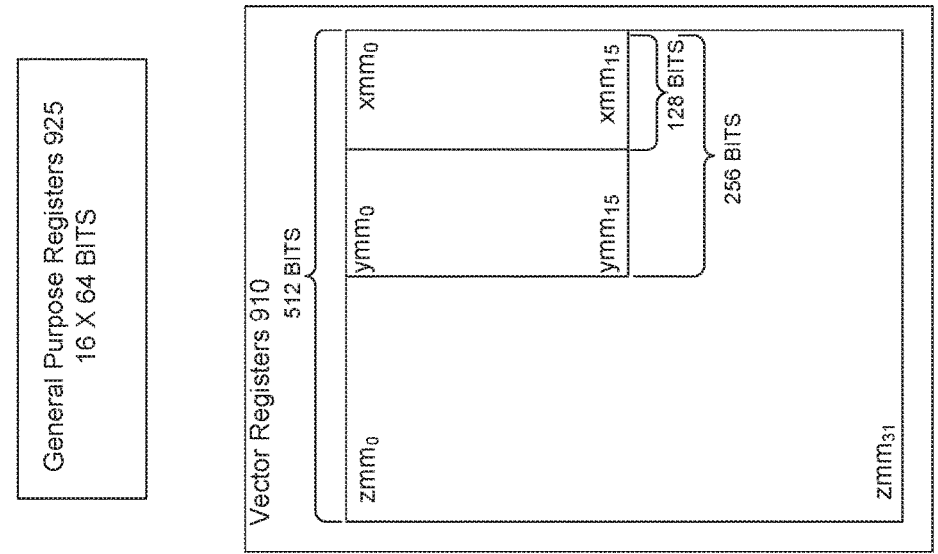
FIG. 9 is a block diagram of a register architecture according to one embodiment of the invention.

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
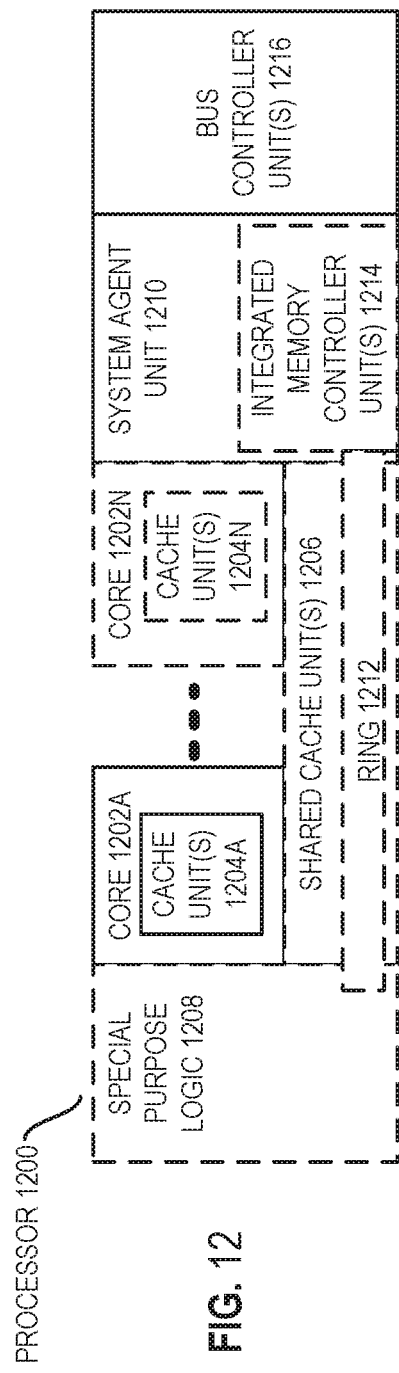
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
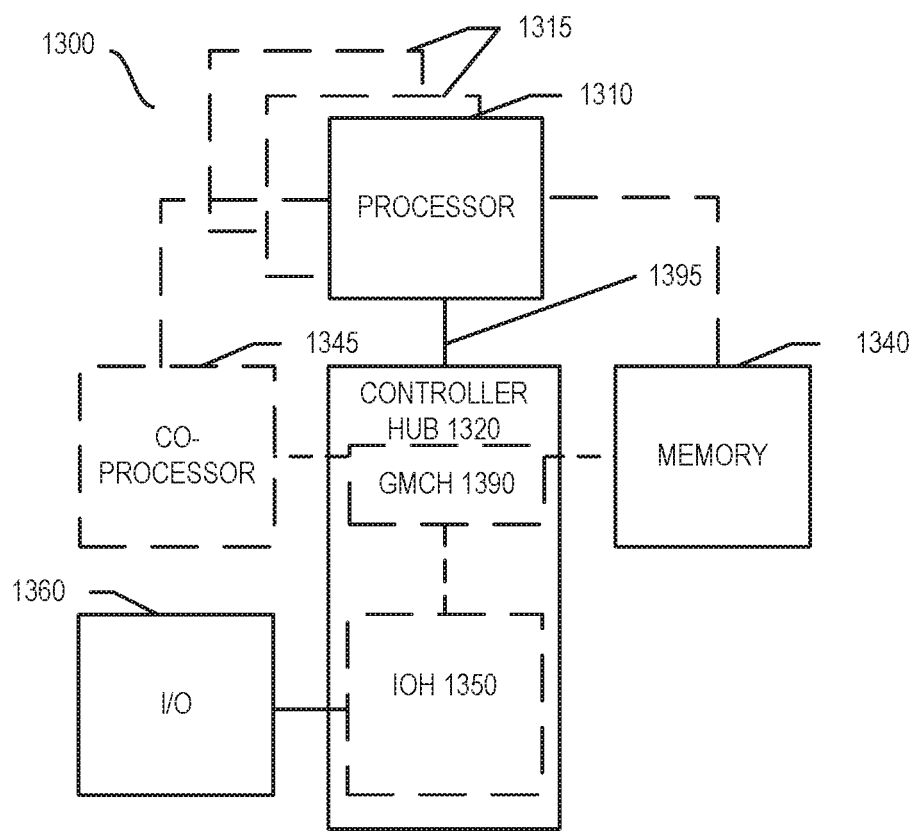
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor (s) 1345 accept and execute the received coprocessor instructions.

Figure 14:
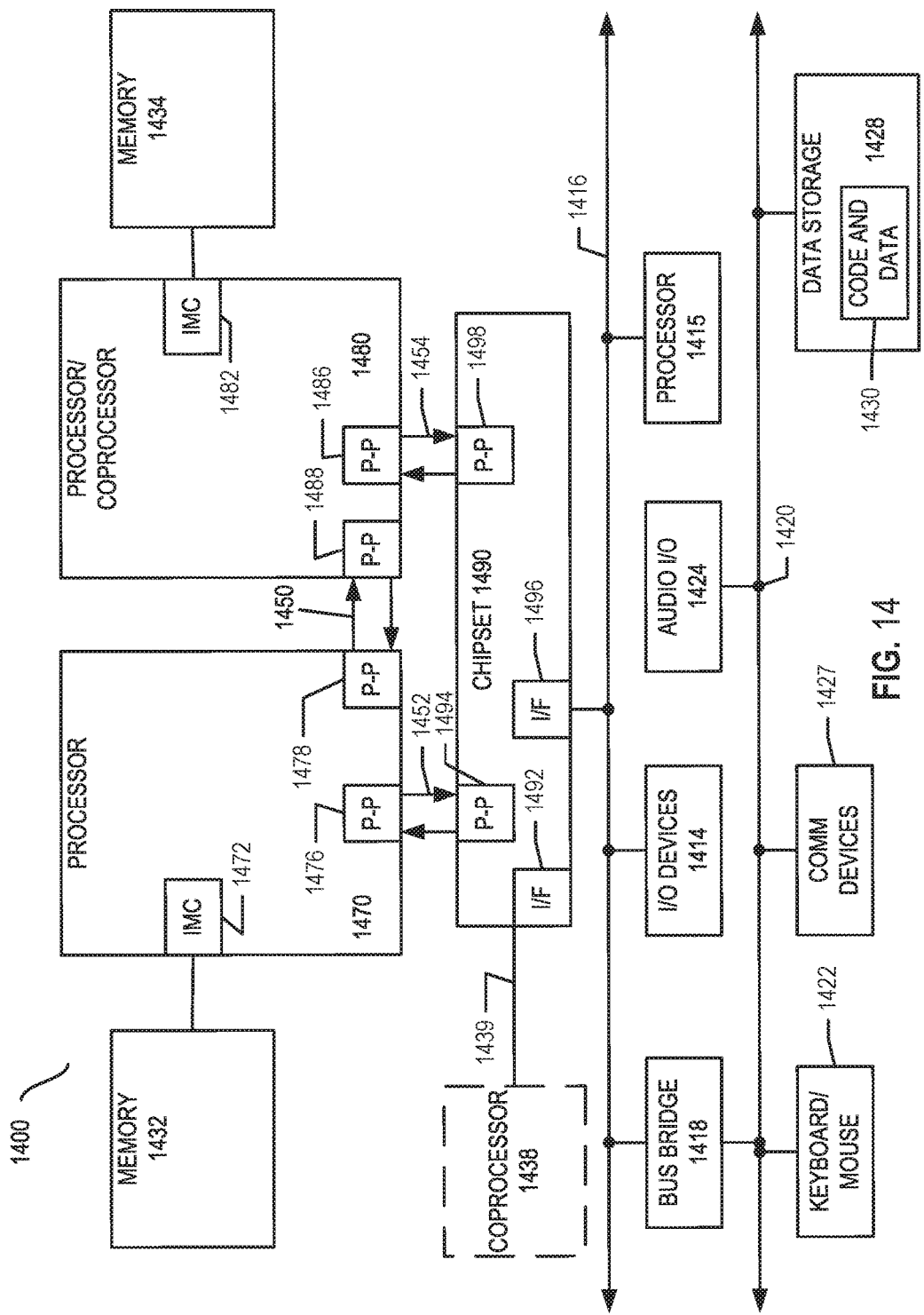

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
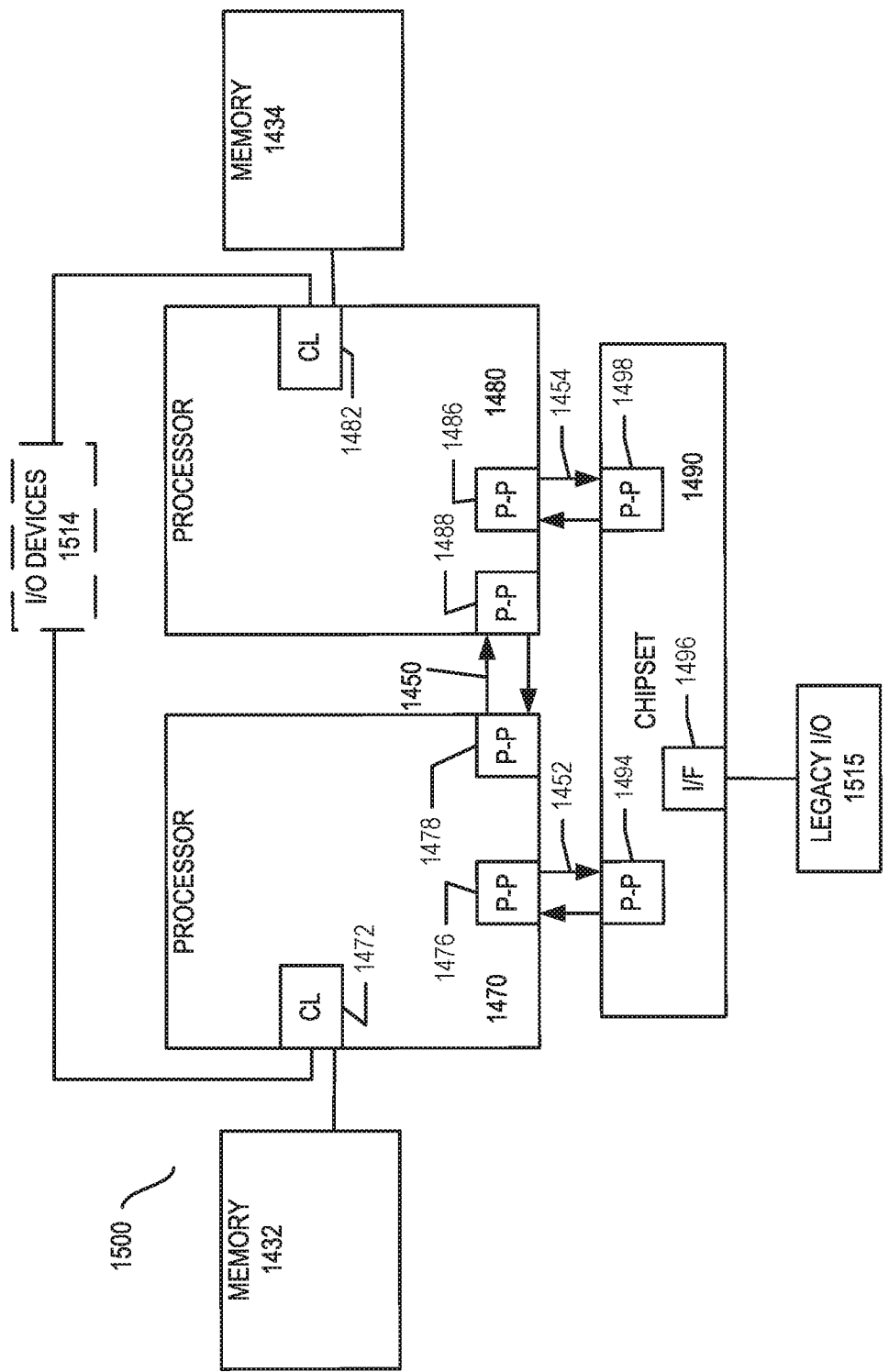

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
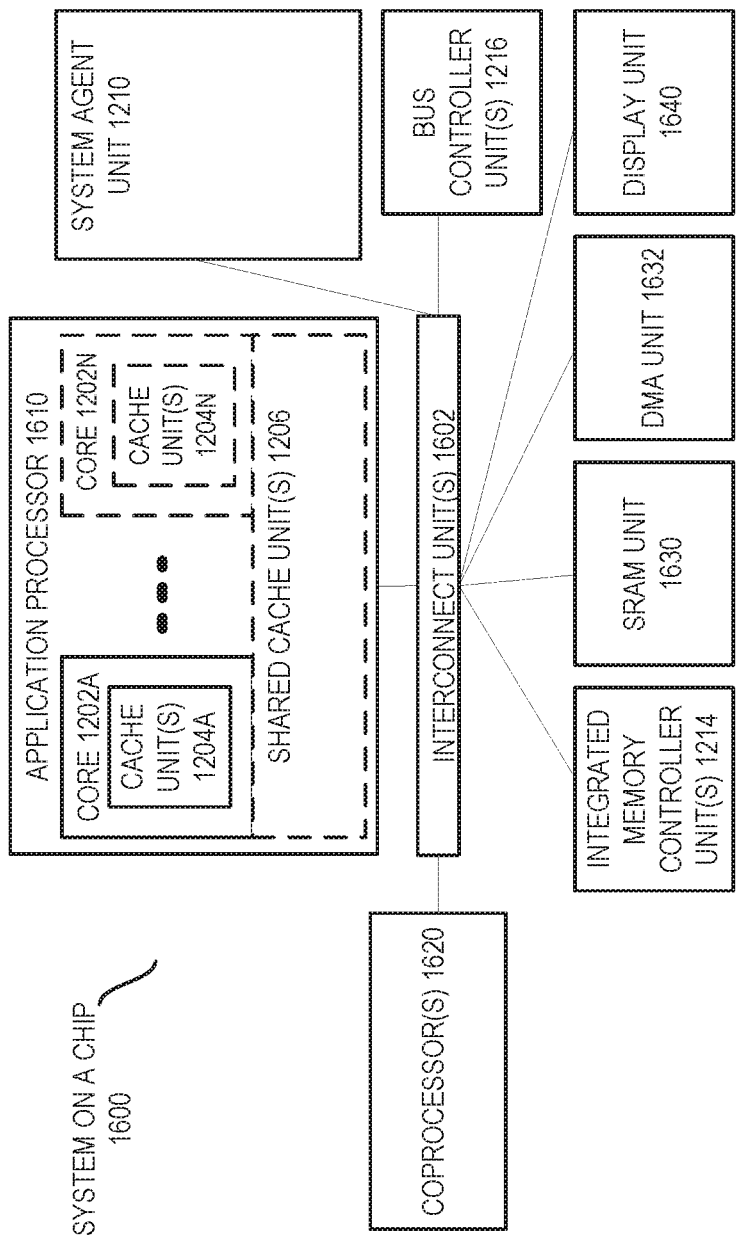

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
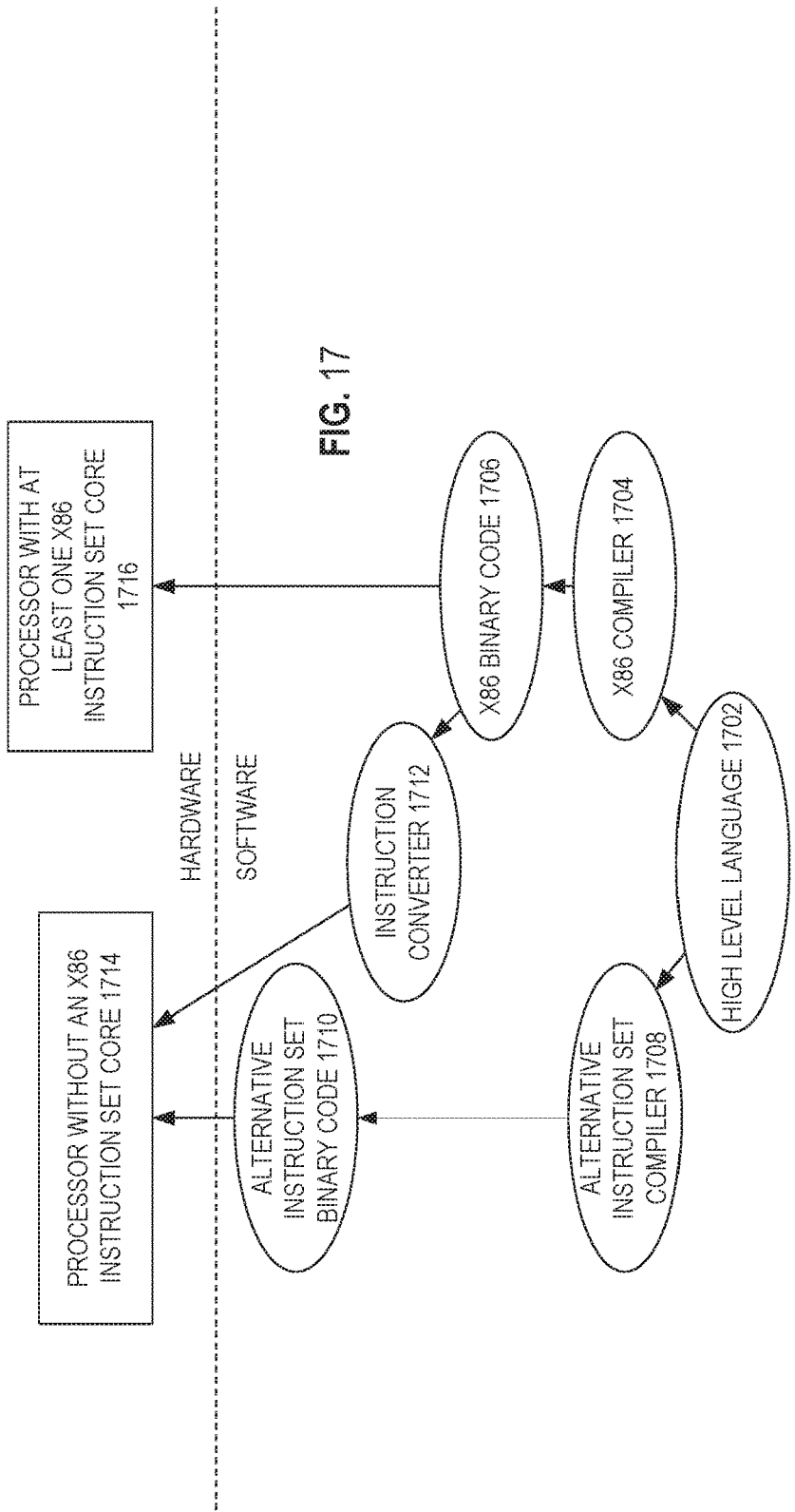
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

We claim:

1. An apparatus comprising:
    circuitry to replicate input sources of a scalar arithmetic instruction, wherein an opcode of the scalar arithmetic instruction is to indicate the use of using single instruction, multiple data (SIMD) hardware;
    arithmetic logic unit (ALU) circuitry to execute the scalar arithmetic instruction with replicated input sources using the SIMD hardware to produce a packed data result; and
    comparison circuitry coupled to the ALU circuitry to evaluate the packed data result and output a singular data result into a destination of the scalar arithmetic instruction, wherein the singular data result is to be stored as a scalar in a least significant data element of a packed data destination register.

2. The apparatus of claim 1, wherein the inputs sources are scalar.

3. The apparatus of claim 1, wherein the comparison circuitry is to vote on a majority result to output.

4. The apparatus of claim 3, wherein the comparison circuitry is to output a signal indicating agreement or disagreement of the vote.

5. The apparatus of claim 1, wherein the comparison circuitry is to output an indication of a fault when there is a fault.

6. A method comprising:
    decoding a scalar arithmetic instruction;
    replicating source data of the decoded scalar arithmetic instruction;
    executing the decoded scalar arithmetic instruction using the replicated data to produce a packed data result; and
    storing a singular data result from the packed data result, wherein the singular data result is to be stored as a scalar in a least significant data element of a packed data destination register.

7. The method of claim 6, wherein the instruction is a scalar instruction, further comprising:
    mapping the decoded instruction to a single instruction, multiple data (SIMD) instruction.

8. The method of claim 6, wherein the instruction is a single instruction, multiple data (SIMD) instruction.

9. The method of claim 6, further comprising:
    determining that there is a fault; and
    output a signal indicating the fault.

10. The method of claim 6, further comprising:
    determining the packed data result is tolerable; and
    output a signal indicating agreement.

11. The method of claim 6, further comprising:
    determining the packed data result is not tolerable; and
    output a signal indicating disagreement.

12. The method of claim 6, wherein replicating source data of the decoded instruction comprises duplicating the source data into at least one packed data register.

13. The method of claim 6, wherein replicating source data of the decoded instruction comprises routing the source data to execution hardware.

* * * * *